US010210841B1

(12) United States Patent
Singley et al.

(10) Patent No.: US 10,210,841 B1
(45) Date of Patent: Feb. 19, 2019

(54) PULL-TO-VIEW IMAGE USER INTERFACE FEATURE

(71) Applicant: Yelp Inc., San Francisco, CA (US)

(72) Inventors: Eric Singley, San Francisco, CA (US); Gabriel Handford, San Francisco, CA (US); Madhu Prabaker, San Francisco, CA (US); Yoni de Beule, Daly City, CA (US)

(73) Assignee: Yelp Inc., San Francisco, CA (US)

( * ) Notice: Subject to any disclaimer, the term of this patent is extended or adjusted under 35 U.S.C. 154(b) by 0 days.

(21) Appl. No.: 13/946,950

(22) Filed: Jul. 19, 2013

(51) Int. Cl.
*G06F 3/0488* (2013.01)
*G09G 5/00* (2006.01)
*G06F 3/041* (2006.01)
*G06F 3/044* (2006.01)

(52) U.S. Cl.
CPC ............. *G09G 5/006* (2013.01); *G06F 3/041* (2013.01); *G06F 3/044* (2013.01); *G06F 3/0488* (2013.01); *G06F 3/04883* (2013.01)

(58) Field of Classification Search
CPC ..... G06F 3/0488; G06F 3/04883; G06F 3/044
USPC ................................ 345/156–173; 178/18.01
See application file for complete search history.

(56) References Cited

U.S. PATENT DOCUMENTS

| 8,712,477 | B2* | 4/2014 | Yu et al. ....................... 455/566 |
| 9,406,042 | B2* | 8/2016 | Melcher ................. G06Q 10/10 |
| 2009/0094562 | A1* | 4/2009 | Jeong et al. ................... 715/863 |
| 2011/0061019 | A1* | 3/2011 | Clift et al. ..................... 715/790 |
| 2011/0137881 | A1* | 6/2011 | Cheng et al. .................. 707/706 |
| 2011/0288941 | A1* | 11/2011 | Chandra ................ G06Q 30/02 705/14.73 |
| 2013/0124980 | A1* | 5/2013 | Hudson et al. ................ 715/243 |
| 2013/0215040 | A1* | 8/2013 | Bose et al. ..................... 345/173 |
| 2014/0082489 | A1* | 3/2014 | Park ...................... G06F 3/0488 715/702 |
| 2017/0153716 | A1* | 6/2017 | Miyazawa ............ G06F 3/0346 |

* cited by examiner

*Primary Examiner* — Alexander Eisen
*Assistant Examiner* — Mansour M Said
(74) *Attorney, Agent, or Firm* — Van Pelt, Yi & James LLP

(57) ABSTRACT

A pull-to-view image user interface feature is disclosed. In some embodiments, a page comprising a mobile application interface is provided via a display configured to receive tactile input. In response to receiving a tactile input comprising a swipe on the page via the display, an image associated with the page is provided. In the event of detecting a release of the received tactile input, an image gallery associated with the page is provided.

45 Claims, 3 Drawing Sheets

PULL-TO-VIEW IMAGE USER INTERFACE FEATURE

BACKGROUND OF THE INVENTION

A photo gallery may be accessed via one or more user selectable or clickable options. However, such typical options to navigate to a photo gallery may not be efficient or user-friendly in certain contexts.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Figure 1:
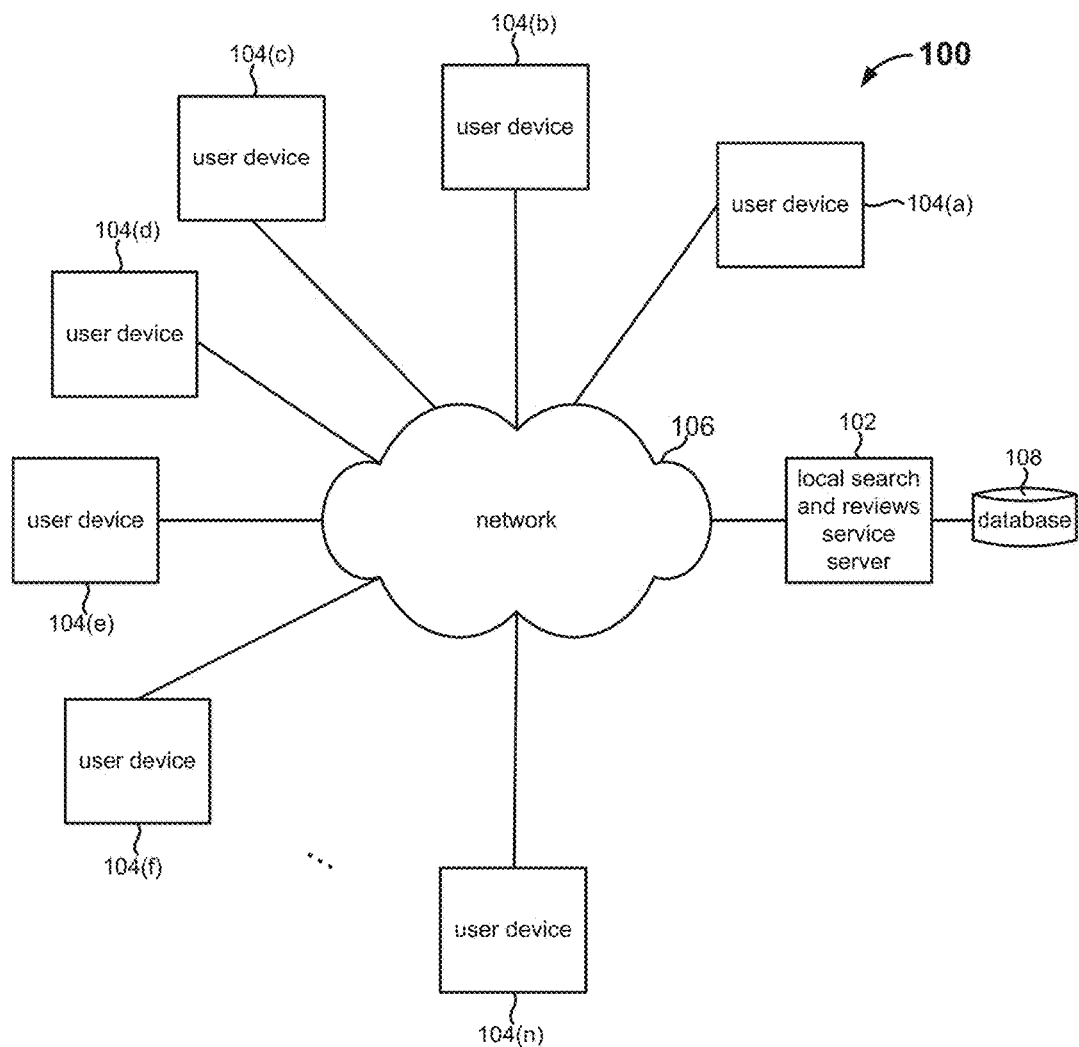
FIG. 1 is a block diagram illustrating an embodiment of a network environment in which a local search and reviews service is deployed.

FIG. 1 is a block diagram illustrating an embodiment of a network environment 100 in which a local search and reviews service is deployed. The local search and reviews service provides a framework for acquiring and posting user reviews and ratings as well as publishing other information associated with various businesses and providing means for searching for businesses by location. Although many of the given examples describe using the local search and reviews service to search for businesses and/or navigate to corresponding business pages, the disclosed techniques may be employed with respect to any other subjects of interest that have listings and/or published pages with respect to the local search and reviews service, such as service providers, places or locations, products, etc.

The local search and reviews service is served by server 102 and is accessible to users via any computing device 104 capable of communicating with server 102, such as a desktop computer, notebook computer, tablet computer, personal or enterprise digital assistant, mobile phone, etc. In various embodiments, the service may be accessed by a user device 104 via a client-side application and/or via a web interface such as a web browser. Communication between server 102 and devices 104 is facilitated by network 106, which in various embodiments may comprise any combination of one or more public, private, wired, and/or wireless networks, such as the Internet or a cellular network. The local search and reviews service includes database 108 populated with data such as published page data, user data, advertisement data, etc. Although depicted as single blocks in FIG. 1, the various components comprising the local search and reviews service (i.e., 102, 108) may comprise any number of possibly networked components. For example, server 102 may be a part of a server farm.

A published page of a subject of interest may include photographs uploaded by an owner of the page or subject of interest and/or by other users of the local search and reviews service. For example, a business page may include postings of photographs associated with the business, such as photographs of the exterior/interior of the business building as well as items for sale available at the business. As an example, a restaurant business page may include photographs depicting the ambiance of the restaurant as well as cuisine available at the restaurant. Typically, a published page of a subject of interest includes one or more user selectable or clickable options to navigate to a photo gallery via which a user may view photographs associated with the subject of interest and/or thumbnails thereof. However, in many cases, it is useful to provide a more user-friendly technique for viewing photographs or images associated with a published page of a subject of interest as further described in detail herein.

Improved techniques for viewing and browsing images associated with a published page of a subject of interest (e.g., a business page) are disclosed that provide a more aesthetic and efficient interface for a more engaging and enjoyable user experience, especially, for example, when a published page is accessed via a device with limited screen real estate such as a mobile phone. In some embodiments, a published page includes a "pull-to-view" user interface feature that allows a user to pull down the page and release to directly jump into an associated image gallery. In various embodiments, this feature may be available and employed with respect to any input device that allows a touch, haptic, or other tactile user input such as a touchscreen.

Figure 2B:
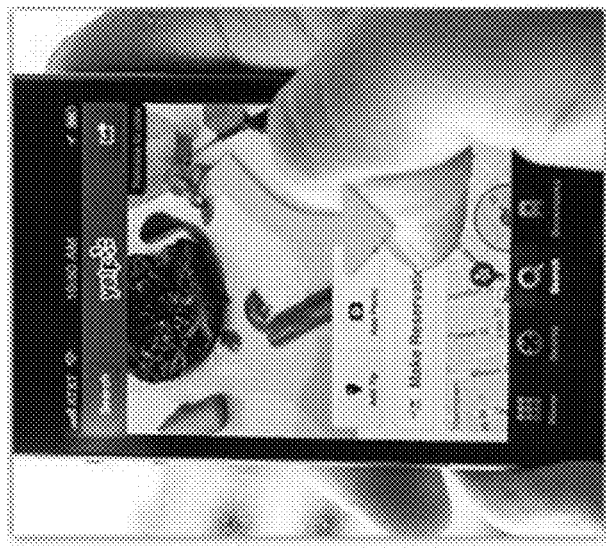
FIGS. 2A-2B illustrate an embodiment of a pull-to-view image feature of a user interface.
Figure 2A:

FIGS. 2A-2B illustrate an embodiment of a pull-to-view image feature of a user interface. In the given example, screenshots of a mobile phone depict an interface of a local search and reviews service mobile application. An interface of a business page, as depicted in FIG. 2A, provides various user options as well as access to business details, photographs, review highlights, reviews, tips, etc. The animation depicted by FIGS. 2A-2B specifically illustrates the disclosed pull-to-view feature by which a user pulls down the page and releases to jump directly into an image gallery associated with the business. Although depicted in the context of a mobile application associated with a local search and reviews service in the given example, the described pull-to-view feature may be incorporated into any application interface of any type of device that allows tactile input, e.g., via a display, to navigate directly from a page (such as a home, main, or other page) to an associated photo stream or gallery.

In some embodiments, a published page may include a plurality of layers, one or more of which may have a degree of transparency. For example, a main, home, or other published page associated with a subject of interest may be semi-transparent such that a main or first image associated with the subject of interest is at least in part visible underneath the page. With respect to the example of FIGS. 2A-2B, the published page of FIG. 2A may have a degree of transparency such that the image of FIG. 2B is somewhat visible under the main page in FIG. 2A, for example, as a background image. In one example, a finger swipe in a downwards direction moves the background image to the foreground as depicted in FIG. 2B. In some such cases, a finger swipe in an opposite, upward direction moves the image back to the background as in FIG. 2A while a release of the finger while lingering on the image as depicted in FIG. 2B launches a gallery or slideshow of one or more associated images which a user may then view and browse.

Figure 3:
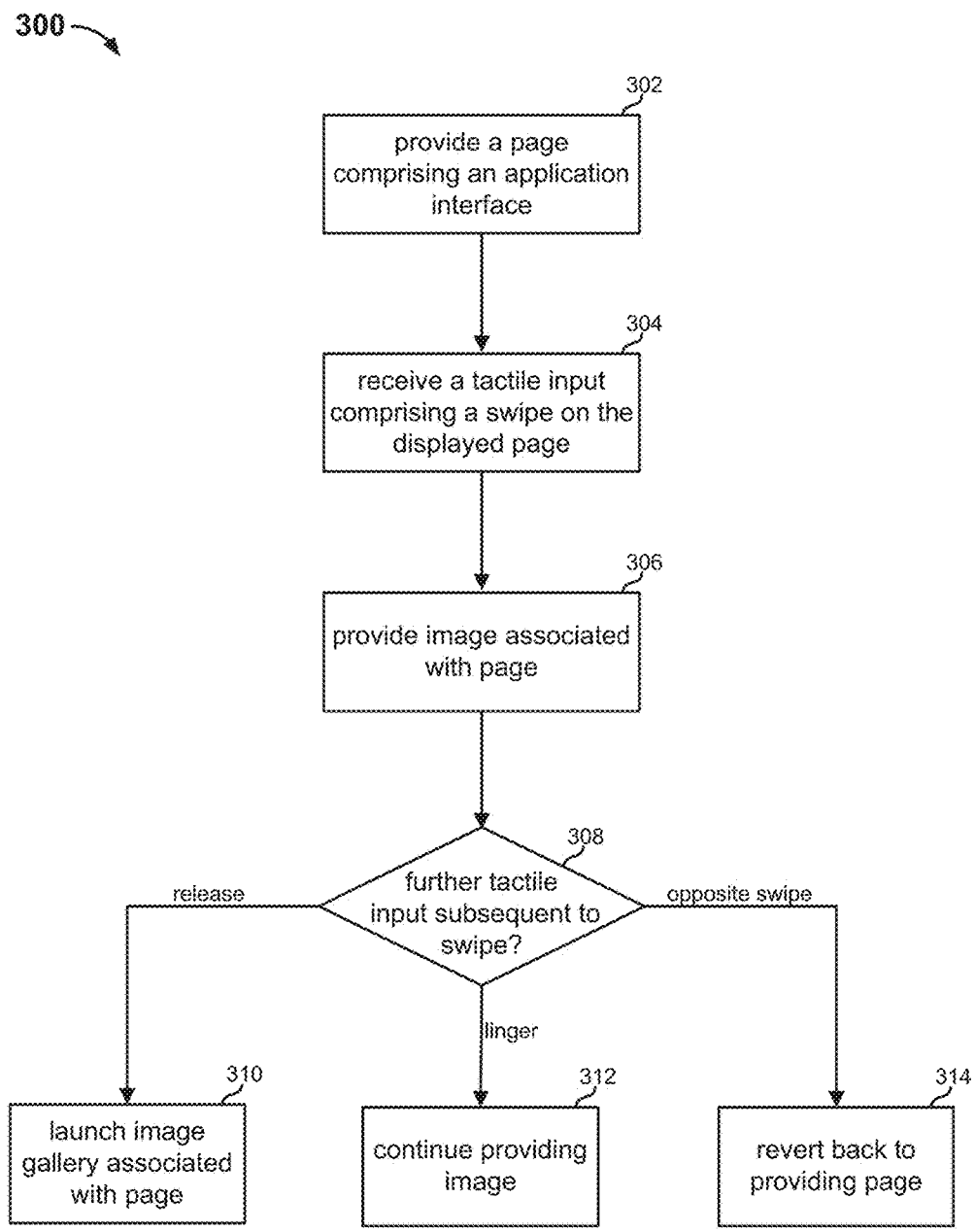
FIG. 3 is a flow chart illustrating an embodiment of a process for providing a pull-to-view image feature.

FIG. 3 is a flow chart illustrating an embodiment of a process for providing a pull-to-view image feature. In various embodiments, process 300 of FIG. 3 may be employed by client-side and/or server-side components of a mobile application, such as an iPhone application. For example, process 300 may be employed by a local search and reviews service mobile application. Process 300 starts at step 302 at which a page comprising an application interface is provided, e.g., via a display of an associated device. In some embodiments, the display via which the page is provided is configured to receive tactile input. For example, the display may comprise a touchscreen. The display may be associated with a device such as a mobile phone, personal or enterprise digital assistant, tablet computer, interactive kiosk, notebook computer, desktop computer, or other computing device.

At step 304, a tactile input comprising a swipe on the displayed page is received, e.g., via the display. For example, the tactile input received at step 304 may comprise a finger swipe corresponding to a pull-down or pull-up of the displayed page. An example of a pull-down finger swipe is depicted with respect to the example of FIGS. 2A-2B. In response to receiving the tactile input at step 304, an image or photograph associated with the page is provided, e.g., via the display, at step 306. In some embodiments, the page provided at step 302 is semi-transparent with the image of step 306 at least partially visible as a background layer of the page. In some such cases, step 306 comprises bringing the image from the background to the foreground.

At step 308, it is determined whether any further tactile input is received subsequent to the swipe received at step 304. If a release is detected at step 308 after the swipe of step 304 (i.e., no further tactile input is received immediately or a prescribed amount of time after the ending position of the swipe of step 304), an image gallery (e.g., a slideshow) associated with the page is launched at step 310 via which a user may view and browse one or more images or photographs associated with the page. If a tactile input at the ending position of the swipe of step 304 is continued to be received at step 308, the image of step 306 is continued to be provided at step 312. If a tactile input comprising a subsequent swipe of the page in a direction opposite the swipe received at step 304 is received at step 308, the display reverts back at step 314 to providing the page of step 302 instead of the image of step 306. In some such cases, for example, the image of step 306 is moved from the foreground back to the background at step 314.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
providing to a client device a home page published by a server via a client-side mobile application interface of a mobile application service provided by the server, wherein content published by the mobile application service includes the home page and an image gallery associated with the home page and wherein the client device comprises a display configured to receive tactile input;
receiving an indication of a swipe on the provided home page via the display of the client device;
in response to the received indication of the swipe, providing a first image of the image gallery via the mobile application interface;
in the event of receiving an indication of a release of the swipe, launching the image gallery associated with the home page via the mobile application interface, wherein only swiping and releasing on the provided home page facilitates directly jumping into the image gallery associated with the home page; and
wherein the swipe is a first swipe and in the event of receiving an indication of a second swipe in a direction opposite the first swipe while lingering on the first image provided in response to the first swipe, reverting back to providing the home page instead of the first image.

2. The method of claim 1, wherein the swipe on the provided home page comprises a finger swipe.

3. The method of claim 2, wherein the finger swipe comprises a pull-down or pull-up of the home page.

4. The method of claim 1, wherein the provided home page is semi-transparent with the first image at least in part visible as a background layer of the home page.

5. The method of claim 1, wherein providing the first image comprises moving the first image from a background layer to a foreground layer of the home page.

6. The method of claim 1, wherein the image gallery comprises images uploaded to the mobile application service by a plurality of users.

7. The method of claim 1, wherein reverting back to providing the home page instead of the first image comprises moving the first image from a foreground layer to a background layer of the home page.

8. The method of claim 1, wherein receiving an indication of a release of the swipe comprises receiving an indication that no further tactile input is received following an ending position of the swipe.

9. The method of claim 1, wherein the image gallery includes a plurality of images including the first image.

10. The method of claim 1, wherein the image gallery comprises a slideshow.

11. The method of claim 1, wherein images comprising the image gallery comprise photographs.

12. The method of claim 1, wherein the home page comprises a home page for a business published by a local search and reviews service.

13. The method of claim 1, wherein the image gallery comprises images uploaded to the mobile application service by an owner associated with the home page and other users.

14. The method of claim 1, wherein the client device comprises a mobile phone, a personal or enterprise digital assistant, a tablet computer, or a kiosk.

15. A system, comprising:
a processor configured to:
provide to a client device a home page published by a server via a client-side mobile application interface of a mobile application service provided by the server, wherein content published by the mobile application service includes the home page and an image gallery associated with the home page and wherein the client device comprises a display configured to receive tactile input;
receive an indication of a swipe on the provided home page via the display of the client device;
in response to the received indication of the swipe, provide a first image of the image gallery via the mobile application interface;
in the event of receiving an indication of a release of the swipe, launch the image gallery associated with the home page via the mobile application interface, wherein only swiping and releasing on the provided home page facilitates directly jumping into the image gallery associated with the home page; and
wherein the swipe is a first swipe and in the event of receiving an indication of a second swipe in a direction opposite the first swipe while lingering on the first image provided in response to the first swipe, revert back to providing the home page instead of the first image; and
a memory coupled to the processor and configured to provide instructions to the processor.

16. The system of claim 15, wherein the swipe on the provided home page comprises a finger swipe.

17. The system of claim 15, wherein the image gallery comprises images uploaded to the mobile application service by a plurality of users.

18. The system of claim 15, wherein receiving an indication of a release of the swipe comprises receiving an indication that no further tactile input is received following an ending position of the swipe.

19. The system of claim 15, wherein the display comprises a touchscreen.

20. A computer program product embodied in a non-transitory computer readable storage medium and comprising computer instructions for:
providing to a client device a home page published by a server via a client-side mobile application interface of a mobile application service provided by the server, wherein content published by the mobile application service includes the home page and an image gallery associated with the home page and wherein the client device comprises a display configured to receive tactile input;
receiving an indication of a swipe on the provided home page via the display of the client device;
in response to the received indication of the swipe, providing a first image of the image gallery via the mobile application interface;
in the event of receiving an indication of a release of the swipe, launching the image gallery associated with the home page via the mobile application interface, wherein only swiping and releasing on the provided home page facilitates directly jumping into the image gallery associated with the home page; and
wherein the swipe is a first swipe and in the event of receiving an indication of a second swipe in a direction opposite the first swipe while lingering on the first image provided in response to the first swipe, reverting back to providing the home page instead of the first image.

21. The system of claim 16, wherein the finger swipe comprises a pull-down or pull-up of the home page.

22. The system of claim 15, wherein the provided home page is semi-transparent with the first image at least in part visible as a background layer of the home page.

23. The system of claim 15, wherein to provide the first image comprises to move the first image from a background layer to a foreground layer of the home page.

24. The system of claim 15, wherein to revert back to providing the home page instead of the first image comprises to move the first image from a foreground layer to a background layer of the home page.

25. The system of claim 15, wherein the image gallery includes a plurality of images including the first image.

26. The system of claim 15, wherein the image gallery comprises a slideshow.

27. The system of claim 15, wherein images comprising the image gallery comprise photographs.

28. The system of claim 15, wherein the home page comprises a home page for a business published by a local search and reviews service.

29. The system of claim 15, wherein the image gallery comprises images uploaded to the mobile application service by an owner associated with the home page and other users.

30. The system of claim 15, wherein the client device comprises a mobile phone, a personal or enterprise digital assistant, a tablet computer, or a kiosk.

31. The computer program product of claim 20, wherein the swipe on the provided home page comprises a finger swipe.

32. The computer program product of claim 31, wherein the finger swipe comprises a pull-down or pull-up of the home page.

33. The computer program product of claim 20, wherein the provided home page is semi-transparent with the first image at least in part visible as a background layer of the home page.

34. The computer program product of claim 20, wherein providing the first image comprises moving the first image from a background layer to a foreground layer of the home page.

35. The computer program product of claim 20, wherein the image gallery comprises images uploaded to the mobile application service by a plurality of users.

36. The computer program product of claim 20, wherein reverting back to providing the home page instead of the first image comprises moving the first image from a foreground layer to a background layer of the home page.

37. The computer program product of claim 20, wherein receiving an indication of a release of the swipe comprises receiving an indication that no further tactile input is received following an ending position of the swipe.

38. The computer program product of claim 20, wherein the image gallery includes a plurality of images including the first image.

39. The computer program product of claim 20, wherein the image gallery comprises a slideshow.

40. The computer program product of claim 20, wherein images comprising the image gallery comprise photographs.

41. The computer program product of claim 20, wherein the home page comprises a home page for a business published by a local search and reviews service.

42. The computer program product of claim 20, wherein the image gallery comprises images uploaded to the mobile application service by an owner associated with the home page and other users.

43. The computer program product of claim 20, wherein the client device comprises a mobile phone, a personal or enterprise digital assistant, a tablet computer, or a kiosk.

44. The computer program product of claim 20, wherein the display comprises a touchscreen.

45. The method of claim 1, wherein the display comprises a touchscreen.

\* \* \* \* \*